3,139,677
METHOD AND APPARATUS FOR INSERTING RESILIENT RODS INTO FLEXIBLE TUBES
Milton Goldstein, Freeport, N.Y.
(364 E. Broadway, Long Beach, Long Island, N.Y.)
Filed Mar. 23, 1959, Ser. No. 801,207
15 Claims. (Cl. 29—451)

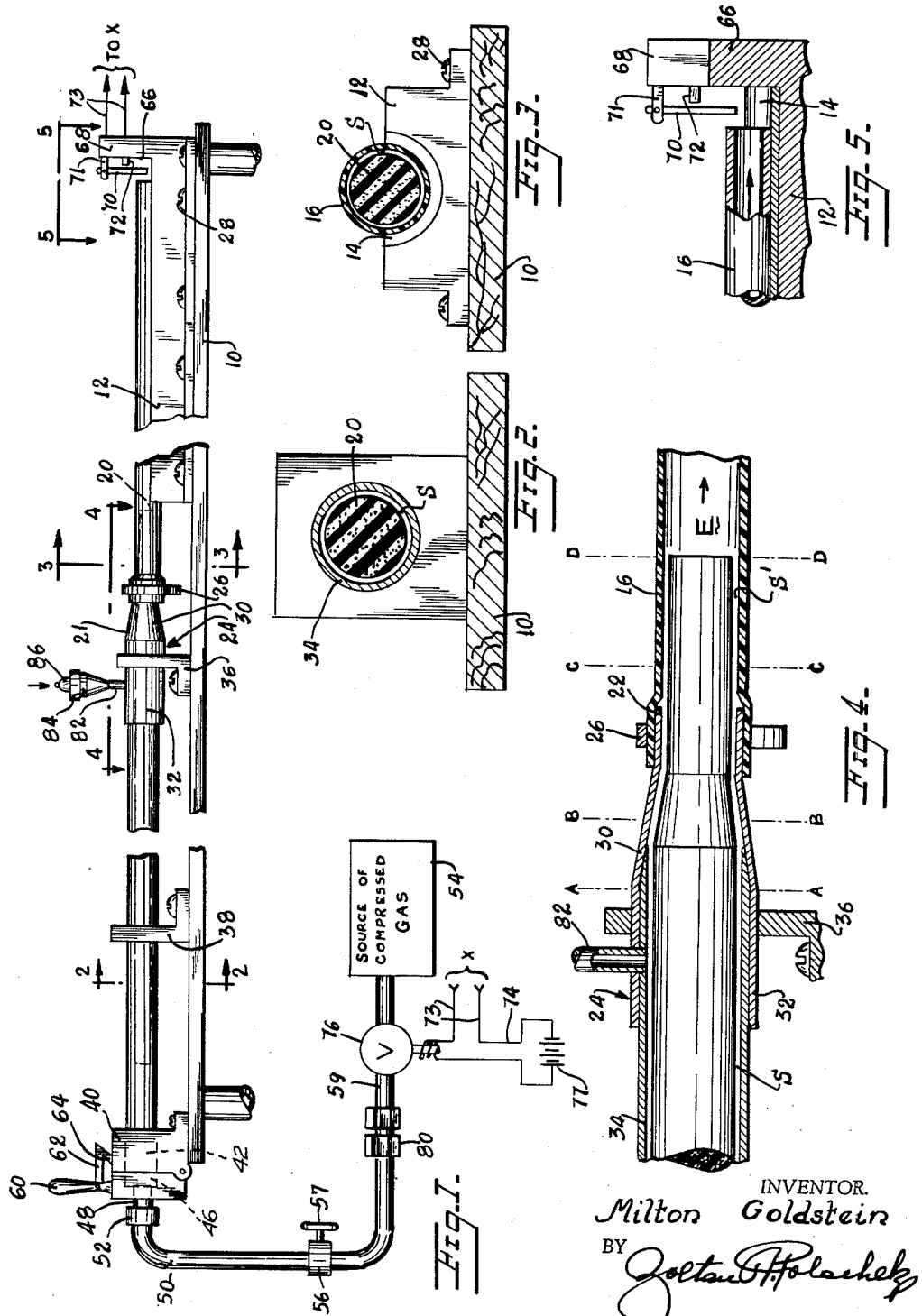

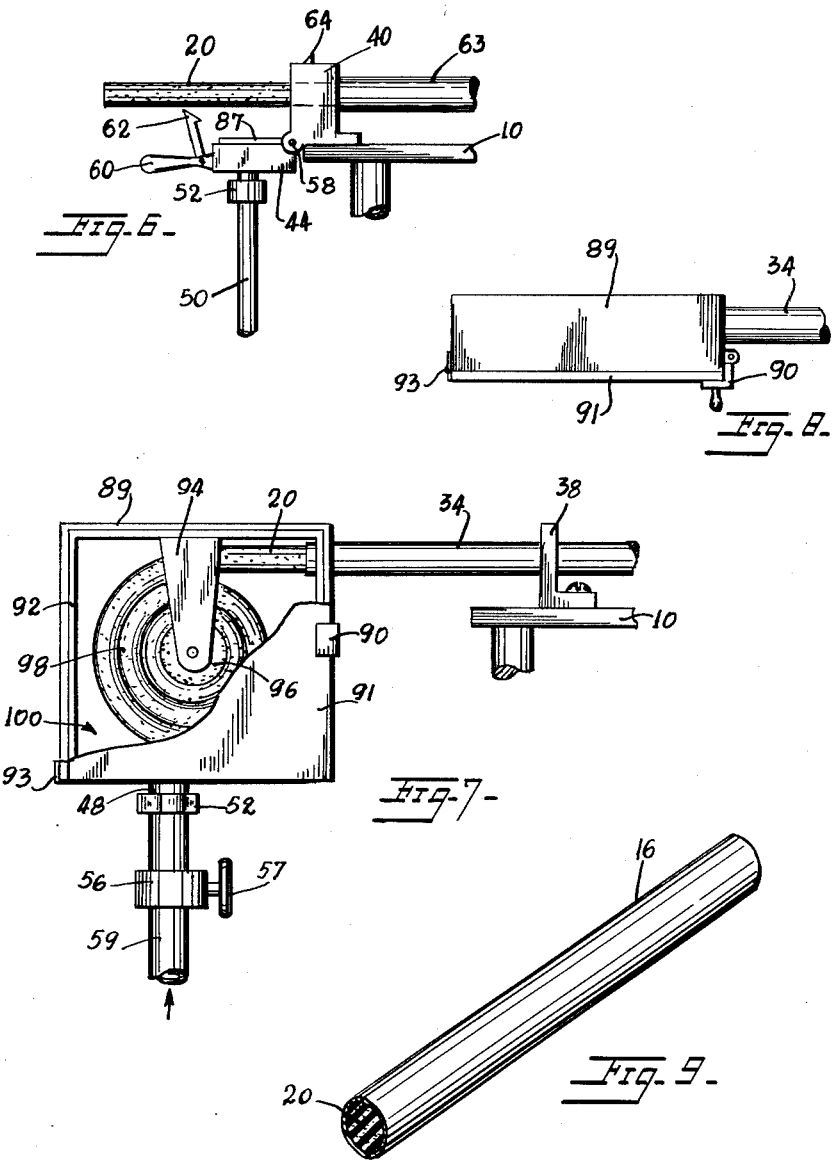

This invention concerns a method and apparatus for inserting a resilient rod into a flexible tube.

The invention has particular applicability to a method and apparatus for manufacturing weather stripping, molding strips, and thermal insulators in which a flexible plastic tube or tubing is provided with a core of sponge rubber.

Heretofore such molding strips have been manufactured by enclosing the cylindrical core in a flat plastic band and heat-sealing the adjacent edges of the band. This results in a longitudinal seam in the jacket enclosing the rubber core. This seam is objectionable because it tends to tear open in use leaving the soft rubber core exposed. In addition, the requirement for heat-sealing apparatus and the labor cost of performing this sealing step are costly in time and material.

It is an object of the present invention to provide a method and apparatus for inserting a rubber core in a flexible tube or tubing by employing air pressure and air suction.

It is a further object to provide an apparatus including means for supporting a flexible tube thereto, and further means for supporting a sponge rubber rod and applying air pressure and suction thereto to force the rod into the tube.

It is another object to provide a method and apparatus in which a coil of sponge rubber rod is supported in an air pressure chamber and passed into a tube by air pressure and suction.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an elevational view partially schematic of an apparatus embodying the invention.

FIGS. 2 and 3 are cross-sectional views taken on lines 2—2 and 3—3 of FIG. 1.

FIGS. 4 and 5 are fragmentary longitudinal sectional views taken on lines 4—4 and 5—5 of FIG. 1, FIG. 4 being on the same scale as FIGS. 2 and 3, while FIG. 5 is on a smaller scale than FIGS. 2, 3 and 4.

FIG. 6 is a fragmentary elevational view of a portion of the apparatus of FIG. 1 showing the air chamber in open position.

FIG. 7 is a fragmentary elevational view of a portion of another apparatus embodying the invention, with a portion broken away to show internal parts.

FIG. 8 is a top plan view of a portion of the apparatus of FIG. 7.

FIG. 9 is a perspective view of a molding strip assembled by the apparatus embodying the invention.

Referring to the drawings, there is shown a stand or table 10 upon which is mounted a support 12 having a semicylindrical cradle 14. The cradle is elongated and has an open top to receive and support a flexible plastic tube or tubing 16. The tube is to be provided with a core 20 in the form of a sponge rubber cylindrical rod shown partially inserted in the tube in FIGS. 1, 3 and 4. One end (i.e., the core-entrance end) of the tubing is removably engaged on the narrow end 22 of a core-insertion-guiding fitting 24. A removable C-shaped spring clamp 26 holds the tube on the fitting. The tubing support 12 is secured to the table by screws 28. Fitting 24 has a tapered section 30 and enlarged cylindrical section 32 in which is inserted one (i.e., the outlet) end of a rigid metal tube 34. The fitting 24 and core-feeding tube 34 are supported by brackets 36 and 38 on the table 10. The other (i.e., gas-intake) end of the tube 34 is secured in a box or block 40 having a recess 42 therein. Pivotally attached to block 40 is a cover in the form of another block 44 having a recess 46. The recesses 42 and 46 form an air or other gas chamber when the blocks are closed, with which chamber the tube 34 communicates. Block 44 carries a stub tube 48 opening into recess 46 and thus into the air chamber. A flexible rubber hose 50 is secured by a clamp 52 to the stub tube 48. This hose is connected to a source 54 of compressed air or other gas via a manually operable valve 56 and air supply pipe 59.

Block 44 is pivotally attached to block 40 by a pintle 58. The block 44 carries a handle 60 and pivotally mounted latch member 62 having a hooked end adapted to engage on the catch 64 on block 40.

The support 12 may have an upstanding end wall 66 which serves as a stop for the core being passed through tube 16. A microswitch 68 can be mounted on this end wall. The switch has an operating lever 70 mounted on arm 71 of microswitch 68 to enable lever 70 to pivot in the path of exit of the core 20. Adjacent and opposite the lever 70 is the operating button 72 of the switch. The switch is a normally closed single pole electrical component having wires 73 connected at points X in the power supply line 74 of a solenoid operated air valve 76 energized by a power source 77. Valve 76 is disposed in the air supply pipe line 59 which is connected to the source of compressed air or gas 54. Pipe line 59 and hose 50 are secured together by coupling 80.

The core 20 normally has a slightly larger diameter than that of the interior of the tube 16 to fit snugly and in slightly compressed condition therein when fully inserted, as shown in FIG. 9.

To operate the device, the air chamber is unlocked by opening the cover to the position shown in FIG. 6. A desired length of sponge rubber core 20 is then inserted through box 40 into the tube 34. The tube has an internal diameter larger than that of the core so that the core slides in easily. The air chamber is then closed and locked in the position shown in FIG. 1. Valve 56 is opened by turning handle 57. The compressed air is forced into tube 34 and through the narrow annular space S around the core 20. The air passes the core and enters tube 16. There an expansion of cross-sectional area of the air path occurs so that the air pressure drops. This causes a difference in gas pressure between the opposite ends of core 20 with high gas pressure at one end at the air chamber and a lowered gas pressure or suction at the end of tube 34.

The core is urged forward toward tube 16 by the coaction of air pressure and suction at opposite ends. Normally it would be expected that the larger diameter core would block the entrance to tube 16, but this does not occur. Actually the pressure of air around the core increases in the tapered portion 30 of fitting 24 as shown in FIG. 4 so that the core becomes compressed in diameter at plane B—B with respect to its original size at plane A—A in pipe 34. As the core advances and enters tube 16, it is further compressed by the air passing it so that its diameter is smaller than the internal diameter of tube 16, as shown at plane C—C and space S' in FIGS. 3 and 4. Furthermore, tube 16 is slightly elastic and expands somewhat due to the pressure of air around the core to enlarge the space S' and permit the core to pass therethrough. In order further to facilitate the passage of the core 20 through tube 16 there may be provided a suitable lubricant such as liquid soap. The lubricant is fed into the tube 34 at fitting section 32 via a conduit 82 supporting a container 84 of the lubricant. The container 84 may be provided with a one-way valve 86 to relieve suction as the lubricant flows into tube 34 on and around the core 20 moving past it. A rubber gasket sealing ring 87 shown in FIG. 6 may be used to seal the gas chamber in the closed box.

As shown in FIG. 4 the leading end of the advancing core 20 in plane D—D is preceded by a low pressure zone E of gas expanding in the tube 16 as it leaves space S'. The actual passage of the core into the tube 16 occurs almost instantaneously, so effective is the combined pressure and suction effect of the apparatus. When the leading end of the core reaches the end of tube 16 it will be stopped by end wall 66. At the same time the lever 70 will be moved by the end of the emerging core to open the switch 68 and the power supply circuit of valve 76 so that air pressure is cut off. The clamp 26 can then be removed and valve 56 will be manually closed so that the filled tube 16 can be removed. The apparatus is now ready to be loaded with a new tube 16 and core 20.

FIGS. 7 and 8 show a modification of the apparatus in which the gas chamber 100 is provide by box 89 having a door or cover 91 secured to the box by a hinge 93. The door is provided with a lock or latch 90 for holding it securely closed. The door is sealed by a gasket 92 to make the chamber in the box airtight. Hose 59 is connected to the box and communicates with the gas chamber to supply compressed gas thereto via valve 56 in the same manner as shown in FIG. 1.

Within the box 89 is mounted a bracket 94 which carries a reel 96 on which is a coil 98 of the sponge rubber rod material providing the core 20 in extended length for filling a plurality of tubes 16 in succession. The apparatus of FIGS. 7 and 8 operates in the same manner as explained for the apparatus of FIGS. 1–6. Gas pressure at the junction end of pipe 34 which opens into box 89 and suction at the free end of core 20 cooperate to urge the rod forward as it unrolls from the reel 96. After each tube 16 is filled by the core, the core will be cut at the narrow end of fitting 24. Thus the core is always in position in tube 34 ready for filling another tube 16 as soon as it is placed in the cradle 14 and attached to the fitting 24.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An apparatus for inserting an elongated compressible core into tubing, which comprises a source of compressed core-propellant gas; a conduit connected to said source for conveying said gas to said tubing, part of said conduit serving as a core-feeding tube for the core to be inserted into the tubing; means for connecting said tubing to the outlet end of said core-feeding tube; supporting means for holding, in extended form and in substantially axial alignment with said core-feeding tube, the tubing to receive said core therefrom; between said gas source and the core-feeding tube, valve means operable to shut off the flow of said gas; electrically actuated means to operate said valve; and switch means for controlling the operation of said electrically actuated means, said switch means being disposed to be operated upon being contacted by the leading end of the core when it reaches the free end of the tubing.

2. An apparatus for inserting an elongated compressible core into tubing, which comprises a source of compressed core-propellant gas; a conduit connected to said source for conveying said gas to said tubing, part of said conduit serving as a core-feeding tube for the core to be inserted into the tubing; means for connecting said tubing to the outlet end of said core-feeding tube; cradle means for holding, in extended form and in substantially axial alignment with said core-feeding tube, the tubing to receive said core therefrom; between said gas source and the core-feeding tube, valve means operable to shut off the flow of said gas; electrically actuated means to operate said valve; and switch means for controlling the operation of said electrically actuated means, said switch means being disposed to be operated upon being contacted by the leading end of the core when it reaches the free end of the tubing; an openable gas-tight chamber interposed in said conduit and communicating with said core-feeding tube at its core-entrance end, and also communicating by a flexible portion of said conduit with the core-propellant gas source; the inside diameter of said core-feeding tube being greater than that of the tubing and than that of the outside diameter of the core; the part of said conduit at the exit end of the core-feeding tube being a core-insertion-guiding fitting having a tapered intermediate section thereby having at its junction with said tube an inside diameter substantially equal to that of said tube and at its outer end an inside diameter about equal to that of the tubing.

3. An apparatus for inserting an elongated compressible core into tubing, which comprises a source of compressed core-propellant gas; a conduit connected to said source for conveying said gas to said tubing, part of said conduit serving as a core-feeding tube for the core to be inserted into the tubing; means for connecting said tubing to the outlet end of said core-feeding tube; cradle means for holding, in extended form and in substantially axial alignment with said core-feeding tube, the tubing to receive said core therefrom; between said gas source and the core-feeding tube, valve means operable to shut off the flow to said gas; electrically actuated means to operate said valve; and switch means for controlling the operation of said electrically actuated means, said switch means being disposed to be operated upon being contacted by the leading end of the core when it reaches the free end of the tubing; an openable gas-tight chamber interposed in said coduit and communicating with said core-feeding tube at its core-entrance end, and also communicating by a flexible portion of said conduit with the core-propellant gas source; the inside diameter of said core-feeding tube being greater than that of the tubing and than that of the outside diameter of the core; the part of said conduit at the exit end of the core-feeding tube being a core-insertion-guiding fitting having a tapered intermediate section thereby having at its junction with said tube an inside diameter substantially equal to that of said tube and at its outer end an inside diameter about equal to that of the tubing; said chamber including a chamber box and a gas-tightly closeable cover therefor; and said flexible portion of said conduit communicating with said chamber through its cover.

4. An apparatus for inserting an elongated compressible core into tubing having an internal cross-sectional area normal to its axis smaller than the cross-sectional area of the core normal to its axis, which apparatus comprises a source of compressed core-propellant gas; a conduit connected to said source for conveying said gas to said tubing, part of said conduit serving as a core-feeding tube for the core to be inserted into the tubing, the inside cross-sectional area of said core-feeding tube normal to its axis being greater than that of the tubing and than the cross-sectional area of the core normal to its axis; the part of said conduit at the exit end of the core-feeding tube being a core-insertion-guiding fitting serving as a means for connecting the tubing to the outlet end of the core-feeding tube and having a tapered intermediate section and thereby having at its junction with said tube an inside cross-sectional area normal to its axis substantially equal to that of said tube and at its outer end a cross-sectional area parallel to said last identified area about equal to that of the tubing; whereby the compressed gas from said gas source will serve as the sole means for causing the insertion of the elongated core into, and propelling it through, the tubing by compressing said core to a cross-sectional area normal to its axis smaller than the inside cross-sectional area of said tubing normal to its axis and propelling said compressed core through said tubing by feeding into said tube holding said core, and thereby around at least a major part of the longitudinal outer-peripheral surface of that length of said core which is within said tube, a stream of core-propellant gas at a pressure sufficient to compress the core and propel it through the tubing by suction acting on the leading end portion of the core, said suction being developed by the speed of flow of said core-propellant gas over said peripheral surface and around said leading end portion of said core.

5. A method for inserting an elongated compressible core into tubing of smaller internal cross-sectional area normal to its axis than the cross-sectional area of the core normal to its axis, which method comprises holding said core in elongated form confined in a confining zone having its confining wall peripherally spaced away from the outer peripheral surface of the core; connecting said tubing, which is to receive the core, in continuous gas-tight communication with said confining zone; compressing said core to a cross-sectional area normal to its axis smaller than the inside cross-sectional area of said tubing normal to its axis and propelling said compressed core through said tubing by feeding into said confining zone holding said core, and thereby around at least a major part of the longitudinal outer-peripheral surface of that length of said core which is within said zone, a stream of core-propellant gas at a pressure sufficient to compress the core and propel it through the tubing by suction acting on the leading end portion of the core, said suction being developed by the speed of flow of said core-propellant gas over said peripheral surface and around said leading end portion of said core.

6. The method as claimed in claim 5, wherein the transverse cross-sectional area of the confining zone is reduced at about its junction with the tubing to about equal to that of the tubing.

7. An apparatus for inserting an elongated compressible core into open-ended tubing having an internal cross-sectional area normal to its axis smaller than the cross-sectional area of the core normal to its axis; and which apparatus comprises a source of compressed core-propellant gas; a conduit connected to said source for conveying said gas to said tubing, part of said conduit serving as a core-feeding tube for the core to be inserted into the tubing; the inside cross-sectional area of said core-feeding tube normal to its axis being greater than that of the tubing and than the cross-sectional area of the core normal to its axis; means whereby to connect said tubing to the outlet end of said core-feeding tube; and supporting means for holding in extended form and extending away from the core-feeding tube outlet end of the tubing to receive said core therefrom, and to allow the end of the tubing remote from the outlet end of the core-feeding tube to remain open for escape of the propellant gas therethrough as it alone propels the core through the tubing, whereby said gas from its source will serve as the sole means for causing the insertion of the elongated core into, and to propel it through, the tubing by compressing said core to a cross-sectional area normal to its axis smaller than the inside cross-sectional area of said tubing normal to its axis and propelling said compressed core through said tubing by feeding into said tube holding said core, and thereby around at least a major part of the longitudinal outer-peripheral surface of that length of said core which is within said tube, a stream of core-propellant gas at a pressure sufficient to compress the core and propel it through the tubing by suction acting on the leading end portion of the core, said suction being developed by the speed of flow of said core-propellant gas over said peripheral surface and around said leading end portion of said core.

8. An apparatus for inserting an elongated compressible core into open-ended tubing having an internal cross-sectional area normal to its axis smaller than the cross-sectional area of the core normal to its axis; which apparatus comprises a source of compressed core-propellant gas; a conduit connected to said source for conveying said gas to said tubing, part of said conduit serving as a core-feeding tube for the core to be inserted into the tubing; the inside cross-sectional area of said core-feeding tube normal to its axis being greater than that of the tubing and than the cross-sectional area of the core normal to its axis; means whereby to connect said tubing to the outlet end of said core-feeding tube; and a cradle for supporting in extended form and extending away from the core-feeding tube outlet end the tubing to receive said core therefrom; and to allow the end of the tubing remote from the outlet end of the core-feeding tube to remain open for escape of the propellant gas therethrough as it alone propels the core through the tubing, whereby said gas from its source will serve as the sole means for causing the insertion of the elongated core into, and to propel it through, the tubing by compressing said core to a cross-sectional area normal to its axis smaller than the inside cross sectional area of said tubing normal to its axis and propelling said compressed core through said tubing by feeding into said tube holding said core, and thereby around at least a major part of the longitudinal outer-peripheral surface of that length of said core which is within said tube, a stream of core-propellant gas at a pressure sufficient to compress the core and propel it through the tubing by suction acting on the leading end portion of the core, said suction being developed by the speed of flow of said core-propellant gas over said peripheral surface and around said leading end portion of said core.

9. An apparatus for inserting an elongated compressible core into open-ended tubing having an internal cross-sectional area normal to its axis smaller than the cross-sectional area of the core normal to its axis, which apparatus comprises a core-feeding tube having a core outlet including means to enable connecting said tubing to the outlet end of said core-feeding tube and through which means the core passes to be inserted into the tubing; the inside cross-sectional area of said core-feeding tube normal to its axis being greater than that of the tubing and than the cross-sectional area of the core normal to its axis; a core-propellant gas inlet in said core-feeding tube and longitudinally axially spaced from its core outlet; a source of propellant gas connected to and communicating with said gas inlet; supporting means, aligned with said core-feeding tube, for holding the tubing in extended form and extending away from the core outlet, and to allow the end of the tubing remote from the outlet end of the core-feeding tube to remain open for escape of the propellant gas therethrough as it alone propels the core through the tubing; whereby the compressed gas from said gas source will serve as the sole means for causing the insertion of the elongated core into, and propelling it through, the tubing by compressing said core to a cross-sectional area normal to its axis smaller than the inside cross-sectional area of said tubing normal to its axis and propelling said compressed core through said tubing by feeding into said tube holding said core, and thereby around at least a major part of the longitudinal outer-peripheral surface of that length of said core which is within said tube, a stream of core-propellant gas at a pressure sufficient to compress the core and propel it through the tubing by suction acting on the leading end portion of the core, said suction being developed by the speed of flow of said core-propellant gas over said peripheral surface and around said leading end portion of said core.

10. An apparatus as claimed in claim 9, wherein a tubular core-insertion-guiding fitting is fitted onto the outlet end of the core-feeding tube, and the free end of said guiding fitting is constructed to permit the core-entrance end of the tubing to be stretched onto it thereby to provide a continuous gas passage from the core-feeding tube into the tubing.

11. An apparatus for inserting an elongated compressible core into open-ended tubing having an internal cross-sectional area normal to its axis smaller than the cross-sectional area of the core normal to its axis; which apparatus comprises a source of compressed core-propellant gas; a conduit connected to said source for conveying said gas to said tubing, part of said conduit serving as a core-feeding tube for the core to be inserted into the tubing; the inside cross-sectional area of said core-feeding tube normal to its axis being greater than that of the tubing and than the cross-sectional area of the core normal to its axis; means whereby to connect said tubing to the outlet end of said core-feeding tube; and supporting means for holding in extended form and extending away from the core-feeding tube outlet end the tubing to receive said core therefrom, and to allow the end of the tubing remote from the outlet end of the core-feeding tube to remain open for escape of the propellant gas therethrough as it alone propels the core through the tubing, whereby said gas from its source will serve as the sole means for causing the insertion of the elongated core into, and to propel it through, the tubing by compressing said core to a cross-sectional area normal to its axis smaller than the inside cross-sectional area of said tubing normal to its axis and propelling said compressed core through said tubing by feeding into said tube holding said core, and thereby around at least a major part of the longitudinal outer-peripheral surface of that length of said core which is within said tube, a stream of core-propellant gas at a pressure sufficient to compress the core and propel it through the tubing by suction acting on the leading end portion of the core, said suction being developed by the speed of flow of said core-propellant gas over said peripheral surface and around said leading end portion of said core; and stopping means for stopping further passage of the core through the tubing after the core arrives at the end of the tubing remote from the outlet end of the core-feeding tube, said stopping means being positioned so as to allow free escape of the propelling gas from said tubing end while the gas is propelling the core through the tubing.

12. An apparatus for inserting an elongated compressible core into open-ended tubing having an internal cross-sectional area normal to its axis smaller than the cross-sectional area of the core normal to its axis; which apparatus comprises a source of compressed core-propellant gas; a conduit connected to said source for conveying said gas to said tubing, part of said conduit serving as a core-feeding tube for the core to be inserted into the tubing; the inside cross-sectional area of said core-feeding tube normal to its axis being greater than that of the tubing and than the cross-sectional area of the core normal to its axis; a part of the core outlet end of the core-feeding tube being of lesser radially transverse cross-section than that of the rest of said tube and to serve to be inserted into one end of the tubing; and an openable gas-tight chamber interposed in said conduit and communicating with said core-feeding tube at its core-entrance end, and also communicating with the source of core-propellant gas; and supporting means for holding in extended form and extending away from the core-feeding tube outlet end the tubing to receive said core therefrom, and to allow the end of the tubing remote from the outlet end of the core-feeding tube to remain open for escape of the propellant gas therethrough as it alone propels the core through the tubing, whereby said gas from its source will serve as the sole means for causing the insertion of the elongated core into, and to propel it through, the tubing by compressing said core to a cross-sectional area normal to its axis smaller than the inside cross-sectional area of said tubing normal to its axis and propelling said compressed core through said tubing by feeding into said tube holding said core, and thereby around at least a major part of the longitudinal outer-peripheral surface of that length of said core which is within said tube, a stream of core-propellant gas at a pressure sufficient to compress the core and propel it through the tubing by suction acting on the leading end portion of the core, said suction being developed by the speed of flow of said core-propellant gas over said peripheral surface and around said leading end portion of said core.

13. An apparatus as claimed in claim 12, wherein the openable chamber includes a chamber box and a gas-tightly closeable cover therefor hingeably connected to the chamber box.

14. An apparatus as claimed in claim 13, wherein said conduit includes also a flexible portion which communicates with said chamber through said cover.

15. An apparatus as claimed in claim 13, wherein disposed within said chamber is a bracket adapted to carry on it in coil form an extensive length of said compressible core to be fed therefrom to said core-feeding tube as said core is drawn from said coil.

References Cited in the file of this patent

UNITED STATES PATENTS

| | | |
|---|---|---|
| 284,050 | Nichols | Aug. 28, 1883 |
| 710,817 | Stevens | Oct. 7, 1902 |
| 1,608,206 | Freedlander | Nov. 23, 1926 |
| 1,733,610 | Leipert | Oct. 29, 1929 |
| 1,830,814 | Thiry | Nov. 10, 1931 |
| 2,090,014 | Wiltse | Aug. 17, 1937 |
| 2,249,510 | Welker | July 15, 1941 |
| 2,351,116 | Frankwich et al. | June 13, 1944 |
| 2,498,357 | Breisch | Feb. 21, 1950 |
| 2,696,443 | Allbright | Dec. 7, 1954 |
| 2,749,758 | Harper et al. | June 4, 1957 |
| 2,844,865 | Cook et al. | July 29, 1958 |